United States Patent
Bogenrieder et al.

(10) Patent No.: US 8,944,463 B2
(45) Date of Patent: Feb. 3, 2015

(54) AIRBAG, IN PARTICULAR FOR A MOTOR VEHICLE

(75) Inventors: Ralf Bogenrieder, Stuttgart (DE);
Christian Burczyk, Stuttgart (DE);
Andreas Hirth, Dielheim (DE);
Friedrich Reiter, Sindelfingen (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 13/822,053

(22) PCT Filed: Sep. 15, 2011

(86) PCT No.: PCT/EP2011/006618
§ 371 (c)(1),
(2), (4) Date: Apr. 17, 2013

(87) PCT Pub. No.: WO2012/079774
PCT Pub. Date: Jun. 21, 2012

(65) Prior Publication Data
US 2013/0214517 A1   Aug. 22, 2013

(30) Foreign Application Priority Data
Sep. 21, 2010   (DE) .......................... 10 2010 046 209

(51) Int. Cl.
*B60R 21/235*   (2006.01)
*B60R 21/30*   (2006.01)
*B60R 21/239*   (2006.01)

(52) U.S. Cl.
CPC ............. *B60R 21/235* (2013.01); *B60R 21/239* (2013.01); *B60R 2021/23542* (2013.01)
USPC .......................... 280/743.1; 280/738; 280/739

(58) Field of Classification Search
USPC .................. 280/728.1, 743.1, 736, 738, 739; 442/76, 203
See application file for complete search history.

(56) References Cited

U.S. PATENT DOCUMENTS

| 3,910,595 | A | * | 10/1975 | Katter et al. ................... 280/732 |
| 3,960,386 | A | * | 6/1976 | Wallsten ........................ 280/731 |
| 5,131,434 | A | * | 7/1992 | Krummheuer et al. .......... 139/35 |
| 5,164,249 | A | * | 11/1992 | Tyler et al. ..................... 442/207 |
| 5,296,278 | A | * | 3/1994 | Nishimura et al. .......... 428/36.1 |

(Continued)

FOREIGN PATENT DOCUMENTS

| CA | 2 608 786 | 11/2006 |
| DE | 10 2005 022 567 A1 | 11/2006 |
| DE | 10 2007 052 264 A1 | 5/2009 |

OTHER PUBLICATIONS

International Search Report with English translation dated May 16, 2012 (four (4) pages.).

(Continued)

*Primary Examiner* — Paul N Dickson
*Assistant Examiner* — Barry Gooden, Jr.
(74) *Attorney, Agent, or Firm* — Crowell & Moring LLP

(57) ABSTRACT

An airbag for a motor vehicle includes a support structure moveable from a storage position into a restraint position and a covering by means of which a restraint volume of the airbag formed by the support structure in its restraint position is surrounded. The covering is formed as an element separate from the support structure and having passage regions in which the covering is at least substantially permeable to air in at least one direction of flow, and connecting regions that are reinforced relative thereto, in which the covering is connected to the support structure.

5 Claims, 3 Drawing Sheets

(56) References Cited

U.S. PATENT DOCUMENTS

| | | | |
|---|---|---|---|
| 5,356,680 A * | 10/1994 | Krummheuer et al. | 428/36.1 |
| 5,474,836 A * | 12/1995 | Nishimura et al. | 442/301 |
| 5,478,333 A * | 12/1995 | Asherman, Jr. | 604/304 |
| 5,542,695 A * | 8/1996 | Hanson | 280/729 |
| 5,704,402 A * | 1/1998 | Bowen et al. | 139/389 |
| 5,921,287 A * | 7/1999 | Bowen et al. | 139/389 |
| 6,024,380 A * | 2/2000 | Kim et al. | 280/743.1 |
| 6,155,596 A * | 12/2000 | Nakajima et al. | 280/730.2 |
| 6,220,309 B1 * | 4/2001 | Sollars, Jr. | 139/389 |
| 6,536,481 B2 * | 3/2003 | Wang | 139/192 |
| 7,296,328 B1 * | 11/2007 | Petri et al. | 26/27 |
| 7,325,830 B2 * | 2/2008 | Higuchi et al. | 280/738 |
| 7,635,144 B2 * | 12/2009 | Kim et al. | 280/728.1 |
| 7,651,118 B1 * | 1/2010 | Veiga | 280/728.1 |
| 7,681,602 B2 * | 3/2010 | Youn et al. | 139/383 R |
| 7,686,331 B2 * | 3/2010 | Li et al. | 280/743.1 |
| 7,799,708 B2 * | 9/2010 | Francis et al. | 442/76 |
| 2002/0130503 A1 * | 9/2002 | Matsui et al. | 280/743.1 |
| 2003/0060104 A1 * | 3/2003 | Veiga | 442/76 |
| 2003/0214124 A1 * | 11/2003 | DePottey et al. | 280/739 |
| 2006/0097539 A1 * | 5/2006 | Noisternig et al. | 296/70 |
| 2006/0194007 A1 * | 8/2006 | Ishii et al. | 428/34.3 |
| 2006/0197326 A1 * | 9/2006 | Sarmiento et al. | 280/739 |
| 2006/0249933 A1 | 11/2006 | Sollars, Jr. | |
| 2009/0224515 A1 | 9/2009 | Breed et al. | |
| 2010/0048079 A1 * | 2/2010 | Fujiyama et al. | 442/189 |
| 2011/0031722 A1 * | 2/2011 | Baumann et al. | 280/728.1 |
| 2012/0043741 A1 * | 2/2012 | Yamamoto | 280/730.2 |
| 2012/0058699 A1 * | 3/2012 | Huber et al. | 442/189 |

OTHER PUBLICATIONS

German-language Written Opinion (PCT/ISA/237) (five (5) pages).

* cited by examiner

Support Structure in Storage Position

Support Structure in Restraint Position

AIRBAG, IN PARTICULAR FOR A MOTOR VEHICLE

BACKGROUND AND SUMMARY OF THE INVENTION

The invention relates to an airbag, in particular for a motor vehicle.

German Patent Publication DE 10 2007 052 264 A1 discloses an airbag for a motor vehicle, with a support structure that can be moved out of a storage position into a restraint position, and with a covering by means of which a restraint volume of the airbag, which is formed by the support structure in its restraint position, is surrounded.

Exemplary embodiments of the present invention are directed to an airbag having a reduced installation space requirement.

According to exemplary embodiments of the present invention, an airbag, in particular for a motor vehicle, comprises a support structure that can be moved out of a storage position into a restraint position. Further, the airbag comprises a covering by means of which a restraint volume of the airbag, which is formed by the support structure in its restraint position, is surrounded.

According to the invention, provision the covering is formed as an element that is separate from the support structure and has passage regions in which the covering is at least substantially permeable to air in at least one direction of flow, and connecting regions that are reinforced relative thereto and are optionally impermeable to air in which the covering is connected to the support structure. The covering thus represents a support for the support structure, to which the support structure is fastened. The covering makes it possible in this case a medium, in particular ambient air, upon the movement of the support structure or the airbag into the restraint position, to be able to flow particularly quickly in the one direction of flow through the covering into the restraint volume, so that the support structure with the covering in a particularly short time can occupy a particularly large volume in a passenger compartment of the motor vehicle, in order to be able to intercept, restrain and protect against serious injuries at least one occupant particularly well in the event of an accident-related application of force.

Further, the covering, in particular due to the connecting regions that are impermeable to air, which are formed reinforced relative to the passage regions, can absorb forces that are produced as a result of the accident-related application of force, in order advantageously to be able to restrain the or several occupants in the passenger compartment.

Due to the configurations of the passage regions and the connecting regions that differ from each other, the covering is non-homogeneous, and functions as a non-homogeneous support for the support structure, in which the passage regions and the connecting regions are formed according to requirements and are adapted to their respective purposes. This makes it possible to make the covering particularly thin, but at the same time particularly tear resistant. As a result of this, the covering and hence the entire airbag, in particular in the storage position, has an only very low installation space requirement, which results in package problems being solved or avoided. At the same time, the airbag according to the invention ensures particularly good protection of the occupant or occupants in the case of an accident-related application of force to the motor vehicle. Furthermore, due to the non-homogeneous configuration of the covering, the weight of the airbag can be kept low, which is of benefit for a low total weight of the motor vehicle and hence a low fuel consumption and low $CO_2$ emissions.

In the passage regions, a respective valve functionality is advantageously provided by the covering. In other words, the covering in the passage regions has in each case at least one valve, in particular a tube valve. This valve makes it possible in this case for a medium, in particular ambient air, upon the movement of the support structure into the restraint position, to be able to flow through the covering with a particularly large mass stream in a particularly short time in the one direction of flow and to be able to flow into the restraint volume. Further, the valve or valves advantageously make(s) it possible at least substantially to avoid the medium, in particular the ambient air, flowing in a second direction of flow that is opposed to the one direction of flow through the covering out of the restraint volume, or to permit a mass stream of the medium, in particular the ambient air, in the second direction of flow out of the restraint volume, which is considerably less than a mass stream of the medium, in particular the ambient air, in the first direction of flow into the restraint volume.

If, for example, an occupant strikes the support structure and the covering, which is referred to as plunging, an internal pressure prevailing in the restraint volume is thereby increased, which would cause the medium, in particular the ambient air, to flow out of the restraint volume, this however being at least substantially prevented or slowed down by the valves. The at least substantial preventing or slowing down of the medium flowing out of the restraint volume ensures a particularly long and good service life of the support structure and the covering, so that the plunging occupant can be intercepted and restrained particularly well. Furthermore, the particularly long service life makes it possible to move the support structure and the covering into the restraint position particularly early and possibly even before the actual accident-related application of force to the motor vehicle, the support structure and the covering being for example unfolded from the storage position.

The support structure comprises, for example, a plurality of volume elements, in particular tube elements, the respective volumes of which can be enlarged. For this, the volume elements can be filled, in particular inflated, for example with a medium, in particular with a gas. As a result of acting upon the volume elements with the medium, for example by means of at least one pyrotechnic actuator, in particular a gas generator, the support structure is moved out of the storage position and unfolded, and in the restraint position takes up a particularly large volume in the passenger compartment. Advantageously, at least a partial amount of the volume elements are connected together fluidically to form a common duct system. This has the advantage that, as a result merely, one actuator, in particular a gas generator, is necessary in order to act upon the volume elements that are connected together fluidically with the medium, in particular gas, and thus to enlarge their respective volumes. Such a support structure in this case has the advantage that a total volume that is to be acted upon by the medium and that consists of the individual volumes of the respective tube elements is considerably less than the restraint volume formed by the support structure in its restraint position. This allows a particularly rapid movement of the support structure into the restraint position, so that it takes up a particularly large volume in the passenger compartment particularly early and thus can intercept and restrain the occupant particularly well. Moreover, the support structure can thereby be moved into the restraint position in a particularly gentle and soft manner for the occupant.

In one advantageous embodiment of the invention, the covering is formed at least partially as a fabric. In other words, the covering comprises at least one fabric layer, the fabric or the fabric layer in the connecting regions having a greater thread density and/or a greater thread size compared with the passage regions. The connecting regions can thereby assume a load-bearing function and ensure a high tear strength of the covering, whereas the passage regions advantageously permit rapid flowing of the medium into the restraint volume and a long service life of the airbag.

The fabric or the fabric layer of the covering in this case is formed to be advantageously permeable to air, so that the medium, in particular the ambient air, can flow particularly well and rapidly into the restraint volume. In this case, the covering comprises, for example, a further layer, in particular a sheet, which permits flowing of the medium in the one direction of flow into the restraint volume and at least substantially prevents flowing of the medium in the direction of flow opposed to the one direction of flow, or slows it down relative to the flowing in the one direction of flow. The sheet forms, for example, the tube valves, which collapse as a result of the increase in the internal pressure in the restraint volume, at least substantially close passage openings of the sheet or reduce a passage cross section of the passage openings and thus at least substantially prevent the medium, in particular the ambient air, flowing in the second direction of flow out of the restraint volume, or slow it down relative to the flowing in the one direction of flow. The fabric or the fabric layer of the covering in this case has the further function of providing puncture protection, so that the sheet or the tube valves do not puncture and unwantedly turn inside out, which would result in undesirable valve functionality that would be contrary to the valve functionality described.

Further advantages, features and details of the invention will become apparent from the following description of a preferred example of embodiment and with reference to the drawings. The features and combinations of features mentioned above in the description and the features and combinations of features mentioned below in the description of the figures and/or shown in the figure alone are not only usable in the combination specified in each case, but also in other combinations or on their own, without departing from the scope of the invention.

BRIEF DESCRIPTION OF THE DRAWING FIGURE

DETAILED DESCRIPTION

Figure 1:
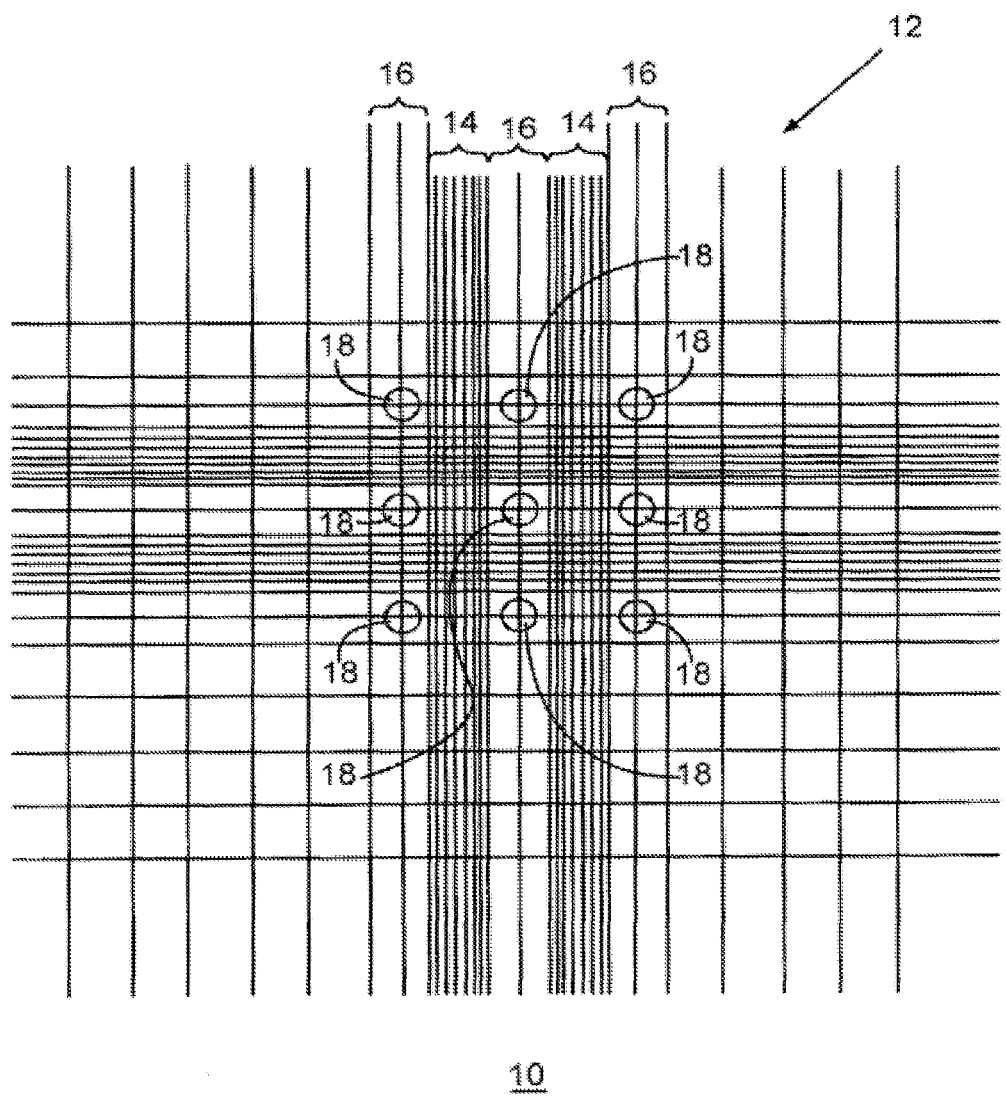
FIG. 1 shows in the figure in part a diagrammatic top view of a covering for an airbag of a passenger car, with a support structure by which a restraint volume of the airbag is formed in a restraint position of the support structure, which volume is surrounded by means of the covering.
Figure 2A:
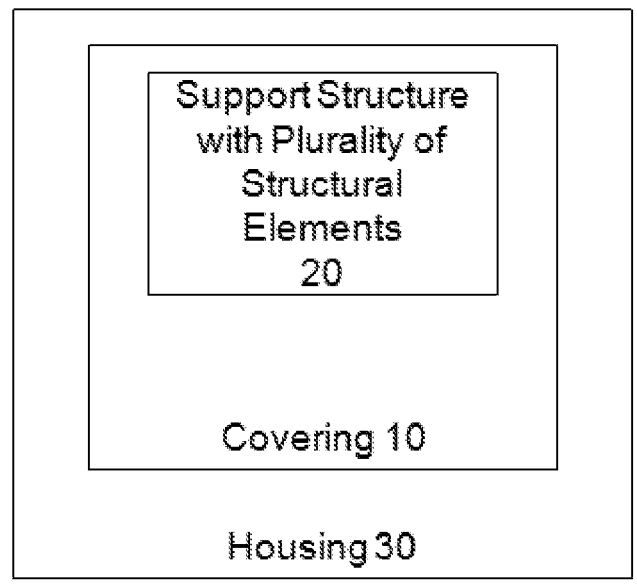
FIGS. 2A and 2B are highly schematic drawings showing a support structure with a plurality of structural elements in a storage and restraint position, respectively.
Figure 2B:
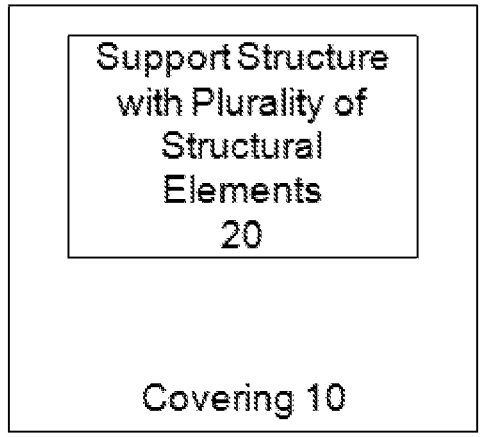

FIG. 1 shows a covering 10 of an airbag of a passenger car. The airbag comprises a support structure 20 with a plurality of structural elements which is shown in a highly schematic form in FIGS. 2A and 2B, which can be moved out of a storage position into a restraint position. In the storage position, the support structure 20 and the covering 10 are accommodated in a housing 30 of the airbag and have a volume that is referred to as "packing volume", which is considerably less than a volume adopted by the support structure and the covering 10 in the restraint position.

In the restraint position, a restraint volume of the airbag which is surrounded by the covering 10 is formed by the support structure. In order to form the restraint volume, the support structure comprises a plurality of tube elements, the respective volumes of which can be enlarged by being acted upon by a gas by means of at least one gas generator and hence inflated. The tube elements in this case are connected together fluidically to form a common duct system. In this manner, the support structure is formed in the manner of a framework, which is why it is also referred to as a framework structure. In this framework structure, the tube elements so to speak represent "beams" of the framework structure. Such a framework structure with tube elements which are fluidically connected together has the advantage that a total volume which is to be inflated, which is composed of the individual volumes of the respective tube elements, is considerably smaller than the restraint volume which is formed by the inflated, unfolded support structure in the restraint position. In this manner, the support structure can be inflated particularly rapidly and gently for an occupant of the passenger car.

In order to present a particularly rapid movement of the support structure and the covering 10 into the restraint position, it is furthermore necessary for the ambient air to be able to flow particularly well and rapidly through the covering 10 into the restraint volume. This has the advantage that as a result it is not necessary to act actively upon the restraint volume with a medium, in particular gas, for example air, but rather the ambient air is drawn passively into the restraint volume upon moving the support structure and the covering 10 into the restraint position.

Figure 3:
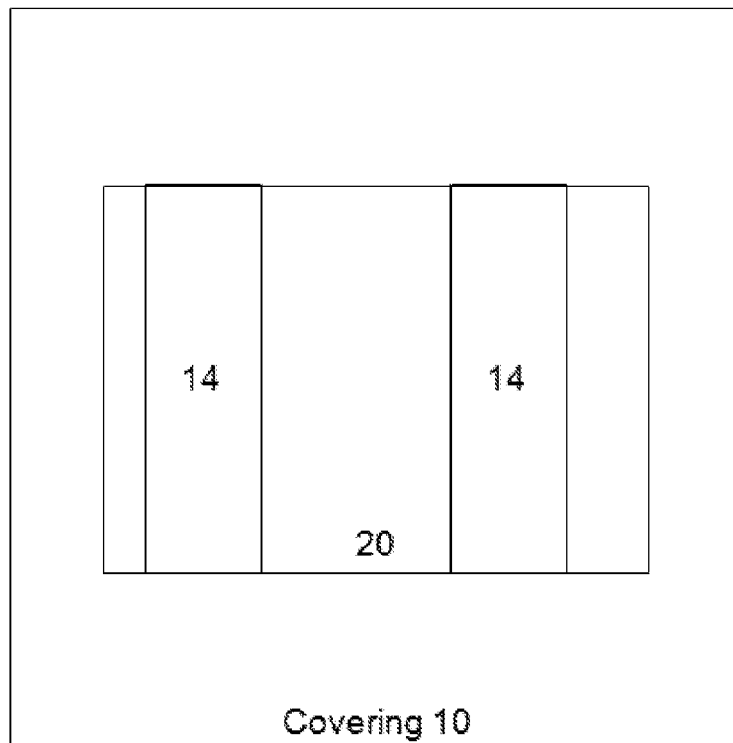
FIG. 3 is a highly schematic drawing showing a support structure connected to a covering by connecting regions.

Furthermore, upon an accident-related application of force to the passenger car, not inconsiderable forces may occur, which act on the airbag and in particular the covering 10 and which have to be absorbed in order to intercept and restrain the occupant. In order to meet these requirements, the covering 10 has a fabric layer 12 that functions as a support for the support structure. As schematically illustrated in FIG. 3, covering 10 in this case is formed as an element that is separate from the support structure 20, and has connecting regions 14 in which the covering 10 is connected to the support structure.

Further, the covering 10 has passage regions 16 with valves 18 which are integrated into the fabric layer 12, in which the covering 10 is permeable to air in a first direction of flow, so that the ambient air in the first direction of flow can flow through the covering 10 and into the restraint volume. In other words, a valve functionality of the covering 10 is provided in the passage regions 16 with the valves 18, which permits flowing of the ambient air in the first direction of flow and thus rapid filling of the restraint volume with ambient air. If the occupant strikes the support structure and the covering 10, an internal pressure prevailing in the restraint volume is increased, which would cause the ambient air to flow out of the restraint volume in a second direction of flow that is opposed to the first direction of flow. The valve functionality provided by the passage regions 16 with the valves 18 then at least substantially prevents undesirable flowing of the ambient air out of the restraint volume in the second direction of flow, or slows down such a flow in the second direction of flow relative to a flow in the first direction of flow. In this case, for example a mass stream of the ambient air out of the restraint volume in the second direction of flow is considerably less than a mass stream of the ambient air in the first direction of flow into the restraint volume. This means that a particularly long service life of the airbag is realized which permits particularly advantageous interception and restraining of the occupant. The connecting regions 14 are not necessarily impermeable to air, but may be impermeable to air.

As can be inferred from the figure, the fabric layer 12 and hence the covering 10 is reinforced in the connecting regions 14 compared with the passage regions 16. In the connecting regions 14, the fabric layer 12 has a higher thread density and/or a larger thread size than in the passage regions 16, so that the fabric layer 12 and hence the covering 10 in the connecting regions 14 and thus overall has a very high tear strength, so that even high forces occurring upon the accident-related application of force can be absorbed by the covering 10 and the occupant can be restrained.

The connecting regions 14 and the passage regions 16 in this manner are adapted to their respective purposes according to requirements. This means that the covering 10 can be made particularly lightweight and particularly thin with a very efficient use of material, which keeps the weight and the installation space requirement of the airbag low. At the same time, the covering 10 ensures particularly good movement of the support structure and the covering 10 into the restraint position and very good and reliable interception and restraining of the occupant.

Figure 4:
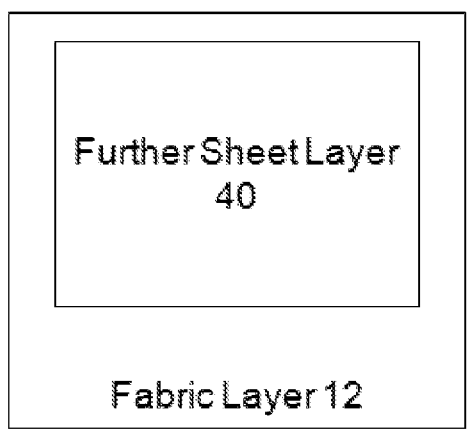
FIG. 4 is a highly schematic drawing showing fabric layer and further sheet layer.

The fabric or fabric layer 12 of the covering is formed to be advantageously permeable to air, so that the medium, in particular the ambient air, can flow particularly well and rapidly into the restraint volume. In this case, as illustrated in highly schematic form in FIG. 4, the covering comprises, for example, a further layer 40, in particular a sheet, which permits flowing of the medium in the one direction of flow into the restraint volume and at least substantially prevents flowing of the medium in the direction of flow opposed to the one direction of flow, or slows it down relative to the flowing in the one direction of flow. The sheet forms 40, for example, the tube valves, which collapse as a result of the increase in the internal pressure in the restraint volume, at least substantially close passage openings of the sheet or reduce a passage cross section of the passage openings and thus at least substantially prevent the medium, in particular the ambient air, flowing in the second direction of flow out of the restraint volume, or slow it down relative to the flowing in the one direction of flow. The fabric or the fabric layer 12 of the covering 10 in this case has the further function of providing puncture protection, so that the sheet or the tube valves do not puncture and unwantedly turn inside out, which would result in undesirable valve functionality that would be contrary to the valve functionality described.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. An airbag for a motor vehicle, comprising:
   a support structure configured to be moveable out of a storage position into a restraint position; and
   a covering configured to surround a restraint volume of the airbag formed by the support structure in its restraint position,
   wherein the covering
      is a separate element from the support structure,
      has passage regions in which the covering is at least substantially permeable to air in at least one direction of flow,
      has connecting regions that are reinforced relative to the passage regions,
   wherein the connecting regions connect the covering to the support structure,
   wherein the covering, in the passage regions, is at least substantially permeable to air in the one direction of flow,
   wherein the covering, in the passage regions, is at least substantially impermeable to air in a further direction of flow that is opposed to the first direction of flow, and
   wherein the covering comprises:
      a first, air permeable textile or fabric layer; and
      at least a second, sheet layer covering the first layer at least in regions and is connected to the first layer in the connecting regions,
   wherein the second layer, in the connecting regions, is impermeable to air,
   wherein at least one of the passage regions includes a plurality of tube valves formed by the second, sheet layer.

2. The airbag as claimed in claim 1, wherein the covering has a higher tear strength in the connecting regions than in the passage regions.

3. The airbag as claimed in claim 1, wherein the covering is formed at least partially as a fabric and in the connecting regions has a higher thread density or a larger thread size compared with the passage regions.

4. The airbag as claimed in claim 1, wherein the support structure comprises a plurality of structural elements configured with changeable volumes.

5. The airbag as claimed in claim 1, wherein the connecting regions are at least substantially impermeable to air.

* * * * *